United States Patent

Shirose et al.

[19]

[11] Patent Number: 4,652,509

[45] Date of Patent: Mar. 24, 1987

[54] TONER FOR DEVELOPING ELECTROSTATIC LATENT IMAGE

[75] Inventors: Meizo Shirose; Jiro Takahashi; Hiroshi Tsuchiya; Tadashi Kaneko, all of Hachioji, Japan

[73] Assignee: Konishiroku Photo Industry Co., Ltd., Tokyo, Japan

[21] Appl. No.: 733,130

[22] Filed: Mar. 10, 1985

[30] Foreign Application Priority Data

May 11, 1984 [JP] Japan .................................. 59-94810
May 11, 1984 [JP] Japan .................................. 59-94811

[51] Int. Cl.$^4$ ............................................. G03G 9/08
[52] U.S. Cl. .................................. 430/110; 430/106.6
[58] Field of Search ............................... 430/109, 110

[56] References Cited

U.S. PATENT DOCUMENTS 4,514,485  4/1985  Ushiyama et al. .................. 430/110

FOREIGN PATENT DOCUMENTS 3208635  9/1982  Fed. Rep. of Germany ...... 430/110
  19535  2/1977  Japan .................................. 430/109

*Primary Examiner*—John L. Goodrow
*Attorney, Agent, or Firm*—Jordan B. Bierman

[57] ABSTRACT

A toner for developing an electrostatic latent image comprising a binder resin, a coloring agent, a compound selected from a group consisting of silica and a hydrophobic aluminum oxide or a hydrophobic titanium oxide.

10 Claims, No Drawings

TONER FOR DEVELOPING ELECTROSTATIC LATENT IMAGE

FIELD OF THE INVENTION

The present invention relates to a toner for developing an electrostatic latent image formed in electrophotography, electrostatic recording, electrostatic printing, etc.

BACKGROUND OF THE INVENTION

Development process of electrostatic latent images generally comprises a step in which electrostatically charged fine toner particles are attracted to and adsorbed onto the surface of an electrostatic latent image-bearing support by electrostatic attractive force.

As practical dry developing process, cascade development, fur brush development, magnetic brush developement, impression development or powder cloud development is widely known and in each development process toner particles to be used are required to have good flowability. With toner having low flowability it would be difficult to carry out smooth development and the image thus obtained would be degraded in its image quality.

As means for giving toner particles improved flowability it has been known in the art that hydrophobic silica is added to a toner composition as disclosed in Japanese Patent Publication for Open to Public Inspection No. 47345/1973. By this it was also possible to obtain a toner image of improved image quality.

However, it has been found to be disadvantageous that black spots are likely to occur in the thus obtained image, especially, when copying is repeatedly carried out for a long time. This phenomenon is considered to take place in the following process.

In electrophotography, so-called cleaning process to remove remaining toner on an electrostatic image-bearing support is usually necessary after image transfer process, in which toner image formed on the electrostatic image-bearing support is transferred onto another recording medium such as paper sheet. In the cleaning process the use of a cleaning blade is widely known because of its high cleaning efficiency and reduced contamination effects upon the surroundings. However, when a toner to which the aforementioned fine particles of hydrophobic silica are added is used, there is a tendency that black spots occur due to spot-like residuals on the electrostatic image-bearing support, which cause reduction of the photoconductivity on such portions, after passing of the support through the cleaning blade.

As for electrostatic latent image-bearing support photoconductive lightsensitive materials such as zinc oxide, selenium, cadmium sulfide and organic photoconductive materials are known and due to its photo-sensitivity, copying duarability or non-polluting property selenium photoconductive materials are widely used. However, the selenium photoconductive material has such technical disadvantage that white streaking, which is a white line- or belt-shaped under-developed portion on a photoconductive plate along its moving direction when a black original is copied, is likely to occur due to crystallization of selenium in the repeated copying under high temperature.

According to the research of the present inventors this crystallization is often either accelerated or restrained in the presence of certain metallic ion.

Further, it is essential for the successful electrostatic development and transfer processes in the electrophotography and the like processes that the toner particles acquire sufficient amount of electrostatic charge during frictional charging process. With a toner having insufficient charges, especially in the development under conditions of high temperature with high humidity, reduction in the density of the transferred image due to insufficient transfer property of the toner image or due to reduced development property is often observed.

SUMMARY OF THE INVENTION

The primary object of the invention is to provide a toner having an good flowability causing reduced black spots.

Another object of the present invention is to provide a toner which is capable of restraining the crystallization of selenium photoconductive materials.

Still another object of the present invention is to provide a toner causing reduced white streaking in the long and repeated copying.

Still another object of the present invention is to provide a toner having an excellent developability and transferability.

Still another object of the present invention is to provide a method for developing an electrostatic latent image formed on a selenium photoconductive photorecepter with a novel toner composition.

These objects of the present invention can be accomplished by a toner developing an electrostatic latent image comprising a binder resin, a coloring agent, a compound selected from a group consisting of a hydrophobic aluminium oxide and a hydrophobized titanium oxide, and silica.

DETAILED DESCRIPTION OF THE INVENTION

As the binder resin used for the present invention, any conventionally known and used binder can be mentioned, for example, a styrene resin, an acrylic resine, a styrene-acrylic copolymer resin, a rosin resin, a polyvinylic resin, an polyolefin resin, a polyamide resin, a polyester resin, a ketone resin, an epoxy resine, and phenolic resin and a mixture thereof.

As for the colorant used for the present invention, any conventionally known colorants and such colorant includes carbon black, Nigrosine(C.I. No. 50415B), Aniline Blue(C.I. No. 50405), Ultranarine Blue(C.I. No. 77103), Chrome Yellow(C.I. No. 14090), Quiniline Yellow(C.I. No. 47005), Rose Bengal(C.I. No. 45435), Du Pont Oil Red(C.I. No. 26105), Phthalocyanine Blue(C.I. No. 74160), Lamp Black(C.I. No. 77266), etc. and a mixture thereof. The amount of the colorant to be incorporated into the toner of the present invention may not be limited but, in general, 1 to 20 parts by weight relative to 100 parts of the binder resin may be preferable. In the case where toner of the present invention is applied to a so-called one-component toner, a magnetic material may be incorporated into the toner composition instead of, or together with the colorants. The magnetic material that may be used includes a compound or an alloy containing therein a ferromagnetic element such as iron, cobalt and nickel; ferrite, magnetite or such an alloy as so-called Heusler's alloy which does not contain a ferromagnetic element but turns to show a ferromagnetic nature by suitably treated by heat, etc.

The aluminium oxide or titanium oxide which is rendered to be hydrophobic(hereinafter called "hydrophobic") is preferably one of which hydroxide group is blocked at the ratio of more than 30%, preferably more than 50% relative to total amount of hydroxide groups bound to the aluminium oxide or titanium oxide. The hydrophobization treatment may be carried out by reacting said inorganic oxide with such compound as a di-alkyl-dihalogeno silane, a tri-alkyl-trihalogeno silane, an alkyl-tri-halogeno silane or a hexalkyl silazane under high temperature.

When an aluminium oxide or titanium oxide of which hydrophobization ratio is less than 30% is used, together with the smallness in its particle size, it is apt to adsorb water in the air and as the result thereof the flowability of a toner tends to fluctuate with the change of the condition of the surroundings. Thus quality of a toner image with such toner also tends to change depending upon the surrounding conditions.

The average particle size of the hydrophobized aluminium oxide or titanium oxide of the present invention may be varied, however, in view of its function as a flowability-giving material, it may preferably be less than 1 micron, and more preferably, less than 0.5 microns.

The hydrophobic aluminium oxide(alumina) or titanium oxide(titania) may be present in the toner in such a condition that the particles of the aluminium oxide or titanium oxide are either mixed with toner particles or cover the surface of the toner particles. The amount of aluminium oxide or titanium oxide to be used in the toner composition may not be limited, however, according to the preferable embodiment of the invention it will be less than 10% by weight relative to total weight of the toner, and more preferably, less than 5% by weight.

The silica to be used in the present invention may be selected from those which are widely known as colloidal silica and those which are undergone hidrophobic treatment are preferable.

As for such colloidal silica to be used in the present invention, "AEROSIL 200", "AEROSIL 300" or "AEROSIL 130", and, as for hydrphobic colloidal silica particles, "AEROSIL R-927", "AEROSIL R-812" or "AEROSIL R-805" (all of these products are manufactured by NIPPON AEROSIL CO., LTD. ) can be mentioned as representative examples.

The amount of silica particles to be used in the present invention is, according to the preferable embodiment of the invention from the viewpoint that toner particle can acquire sufficient amount electrical charge and that the occurrence of black spots are effectively prevented, from 0.01 to 5% by weight relative to total weight of the toner, and more preferably, from 0.05 to 2% by weight.

SYNTHESIS EXAMPLE

A round bottomed flask equipped with a thermometer, a stainless steel stirrer, a glass tube through which to introduce nitrogen and a condenser was charged with 299 g of telephthalic acid, 211 g of polyoxypropylene(2,2)-2,2-bis(4-hydroxy phenyl)propane and 82 g of pentaerythritol. The flask was set in a mantle heater and heated while nitrogen gas was introduced into the flask to keek its interior under an inert atomosophere. Then, 0.05 g of dibutyl tin oxide was added, and reduction was carried out at 200° C. while the softening point was used as a parameter to monitor the progress of the reaction. As a result, polyester resin A with a chloroform insoluble content of 17% by weight was obtained. Thi resin had softening point of 131° C. according to ball and ring softening point measurement as specified in JIS K 1351-1960.

EXAMPLE I 100 parts by weight of polyester resin A obtained by SYNTHESIS EXAMPLE, 10 parts by weight of carbon black ("Morgal L", a product of Cabot Corporation), 3 parts by weight of low molecular polypropylene("Viscol 660P", a product of Sanyo Chemical Industries, Ltd.) were mixed, melted, kneaded, pulverised and classified according to conventional toner manufacturing process to obtain a toner having average particle size of 10 microns. this toner was denoted as "TONER A".

1 part by weight of aluminium oxide particles which were rendered hydrophobic by undergoing treatment with dimethyl-dichloro silane, having the average particle size of 0.02 microns and the hydrphobisation ratio of 70% was added to and mixed with 100 parts by weight of "TONER A" to obtain "TONER B".

EXAMPLE II 0.5 parts by weight of hydrophobic silica "AEROSIL R-812" was added to and mixed with 100 parts by weight of "TONER B" to obtain "TONER C".

EXAMPLE III

"TONER D" was obtained in the same manner as "TONER C" except that in this Example as silica particles "AEROSIL 200" was used instead of "AEROSIL R-812".

EXAMPLE IV

"TONER E" was obtained in the same manner as "TONER B" except that in this Example titane oxide, which was rendered hydrophobic by treatment with dimethyl-dichloro silane and which has the average particle size of 0.03 microns and hydrphobisation ratio of 80% was used instead of the hydrophobic aluminium oxide.

EXAMPLE V

"TONER F" was obtained in the same manner as in EXAMPLE II except that in this Example "TONER E" was used instead of "TONER B".

EXAMPLE VI

"TONER G" was obtained in the same manner as in EXAMPLE III except that in this Example "TONER E" was used instead of "TONER B".

EXAMPLE VII

"TONER H" was obtained in the same manner as "TONER B" except that in this Example magnesium oxide which was rendered hydrophobic by treatment with dimethyl-dichloro silane was used instead of hydrophobic aluminium oxide.

EXAMPLE VIII

"TONER J" was obtained in the same manner as in EXAMPLE II except that in this Example "TONER H" was used instead of "TONER B".

EXAMPLE IX

"TONER K" was obtained in the same manner as "TONER A" except that in this Example 1 part by weight of "AEROSIL R-812" was added to and mixed with 100 parts by weight of "TONER A".

By using these toners repeated copying tests were carried out in order to examine the stability of the image, likeliness of occurrence of black spots and white streakings due to crystallization of the photoconductive material under varied temperatures and relative humidities by utilizing an electrophotograpgic copying machine "U-Bix 1600" (manufactured by Konishiroku Photo Industry co., Ltd.). The results thus obtained are given in Table I:

TABLE I

| Toner Used | Image Density* 20° C., 20% | Image Density* 20° C., 60% | Image Density* 33° C., 80% | Occurrence of Black Spots** | Occurrence of White Streakings*** |
|---|---|---|---|---|---|
| A | 1.1 | 0.8 | 0.4 | NO | YES |
| B | 1.3 | 1.3 | 1.0 | NO | NO |
| C | 1.3 | 1.3 | 1.3 | NO | NO |
| D | 1.3 | 1.3 | 1.2 | NO | NO |
| E | 1.3 | 1.3 | 1.0 | NO | NO |
| F | 1.3 | 1.3 | 1.3 | NO | NO |
| G | 1.3 | 1.3 | 1.2 | NO | NO |
| H | 1.3 | 1.3 | 0.9 | NO | YES |
| J | 1.3 | 1.3 | 1.1 | NO | YES |
| K | 1.3 | 1.3 | 1.2 | YES | NO |

Note:
*Reflection Density of an Original Having a Reflection Density of 1.3.
**Occurrence of Black Spots after 40,000 Repeated Copies.
***Occurrence of White Streakings after 40,000 Repeated Copies.

As apparent from TABLE I toners according to the present invention(TONERS C,D,F and G) show excellent properties for preventing the ocurrence of black spots and white streakings without reduction in the image density after long repeated copying test in comparison with other toners(TONERS A, B, E, H, J and K).

In the toner of the present invention may contain other various additives which are conventionally known and used in the art of the relevant field, such as charge control agents or anti-offset agents.

The use of specific friction reducing agents or lubricants which do not contain a metallic element in the structure instead of or in combination with silica of the present invention are specially advantageous for the purpose of preventing white streakings from taking place. As for these friction reducing agents or lubricants those compounds which are capable of forming a thin film-like deposit on the electrostatic latent image-bearing support and which are softer than toner particles in terms of softness test specified in ASTM D-1760 can be mentioned. More specifically, these friction reducing agents are selected from saturated or unsaturated fatty acids having 8 to 35 carbon atoms, which may be substituted; alcohols thereof; mono-or poly esters of said alcohols; fatty acidamides; polyethylene glycols and methoxy polyethylene glycols.

For example, with a toner prepared in the same manner as "TONER C" and "TONER F" except that stearic acid was used instead of hydrophobic silica respectively, no occurrence of streaking were found even after 60,000 repeated copying test by the use of "U-Bix 1600" in the same manner as in Example IX, although, however, a slight reduction in the image density was observed.

We claim:

1. Toner for developing an electrostatic latent image comprising a binder resin, a coloring agent, a compound selected from a group consisting of silica and a hydrophobic aluminum oxide or a hydrophobic titanium oxide.

2. The toner of claim 1, wherein said hydrophobic aluminium oxide or titanium oxide being incorporated in said toner at an amount not more than 10% by weight relative to the total weight of toner.

3. The toner of claim 1, wherein said hydrophobic aluminium oxide or titanium oxide being incorporated in said toner at an amount not more than 5% by weight relative to the total weight of toner.

4. The toner of claim 1, wherein said hydrophobic aluminium oxide or titanium oxide being produced by heat reacting an aluminium oxide or titatium oxide with a compound selected from a di-alkyl-di-halogenated silane, a tri-alkylhalogenated silane, alkyl-tri-hlogenated silane and a hexaalkyl-di-silazane.

5. The toner of claim 1, wherein said hydrophobic aluminium oxide or titanium oxide having an average particle size of not more than 1 micron.

6. The toner of claim 5, wherein said hydrophobic aluminium oxide or titanium oxide having an average particle size of not more than 0.5 microns.

7. The toner of claim 1, wherein said coloring agent is a magnetic substance.

8. The toner of claim 1, wherein said coloring agent is carbon black.

9. The toner of claim 1, wherein said toner further comprises a compound selected from a group consisting of a hydrophobic aluminium oxide and a friction-reducing agent not containing a metallic element.

10. The toner of claim 9, wherein said friction-reducing agent is selected from fatty acids, alcohols thereof, mono- or poly esters of said alcohols, fatty acidamides, polyethylene glycols and methoxy polyethylene glycol.

* * * * *